Dec. 15, 1942.   G. HANSEN   2,305,160
CAMERA FOR SPECTRAL APPARATUS
Filed Nov. 23, 1940
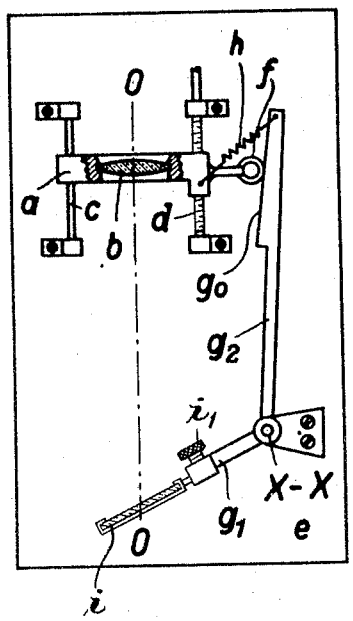
Inventor:

UNITED STATES PATENT OFFICE 2,305,160

CAMERA FOR SPECTRAL APPARATUS

Gerhard Hansen, Jena, Germany; vested in the Alien Property Custodian

Application November 23, 1940, Serial No. 366,815
In Germany December 11, 1939

2 Claims. (Cl. 95—11)

The present invention relates to a camera for spectral apparatus which is so coupled with the prism system of the spectral apparatus that any rotation of the prism system for the purpose of picking out rays of a certain wave-length results in an adjustment relative to each other of the objective and the camera plate holder in the direction of the optic axis and in a change in the inclination of the plate holder towards the optic axis.

In accordance with the invention a simple mechanism for the automatic adjustment of the inclination of the plate holder is obtained if provision is made for two elements movably disposed towards and engaging each other and one of which acts as a guide and the other as a feeler, one of said elements being fixedly connected with an arm for changing the inclination of the plate holder and being so adjusted by the other element when setting the relative distance between the plate holder and the camera-objective that the necessary turn is imparted to said arm.

A very favorable model of camera corresponding to the present invention will result if the adjusting motion in the direction of the optic axis is imparted to the objective and if said feeler is connected to the objective and said guide connected to said arm. By giving said guide the proper curvature it will be possible to ensure that for every amount of said adjusting motion the plate holder is inclined towards the optic axis to such an extent that a sharp image of the spectral range is obtained. In the case of apparatus having prisms and lenses of the same material and said feeler connected to the objective, a sufficiently exact adjustment of the inclination of the plate holder can also be achieved with a plane guide.

The annexed drawing illustrates a diagrammatic view of a constructional example of the invention based on the said special case. The mount $a$ of the camera-objective $b$ of a spectral apparatus is supported by two spindles $c$ and $d$ mounted on a base plate $e$. The spindle $d$ is provided with screw threads and is so coupled with the prism (not drawn) of the spectral apparatus that, on the prism being rotated, the spindle $d$ experiences a rotation bringing about the necessary adjusting motion of the objective $b$ in the direction of the optic axis 0—0.

The mount $a$ carries a roller $f$. Rotatable about an axis X—X a toggle lever is disposed on base plate $e$, one arm, $g_1$, of said lever serving as a support for the plate holder $i$ which may be fixed to the arm $g$, by means of a clamping screw $i$, while the other arm, $g_2$, of said lever is provided with a plane surface $g_0$ which, by means of a spring $h$ acting on the objective-mount $a$ and on the arm $g_2$, is kept in contact with the roller $f$. The distance of roller $f$ from the axis of rotation X—X, and the inclination of surface $g_0$ are to be adopted in accordance with the given prism and the given focal length of the objective $b$.

I claim:

1. In a spectroscope camera for photographing different spectral ranges, a base plate, an objective and a holder for the photographic plate, said objective and said plate holder being mounted on said base plate for displacement relative to each other in the direction of the optic axis of said objective, means for effecting such displacement, said plate holder being rotatably mounted on said base plate, coupling means interposed between said objective and said plate holder and adapted to rotate said plate holder when the above said displacement takes place and to cause said plate holder to so incline towards the optic axis of said objective that a sharp image of the spectral range corresponding to the position of said objective is effected, said coupling means comprising a guide and a feeler, one of these two parts being connected to said objective, while the other part is connected to said plate holder, and elastic means for holding said feeler is contact with said guide.

2. In a spectroscope camera for photographing different spectral ranges, a base plate, an objective mounted on said base plate for displacement in the direction of its optic axis, an arm carrying a holder for the photographic plate, said arm being rotatably mounted on said base plate, means for displacing said objective, coupling means interposed between said objective and said arm, said coupling means being adapted to rotate said arm when said objective is displaced and to cause said plate holder to so incline towards the optic axis of said objective that a sharp image of the spectral range corresponding to the position of said objective is effected, said coupling means comprising a guide connected to said arm, a feeler connected to said objective, and a spring for holding said feeler in contact with said guide.

GERHARD HANSEN.